United States Patent [19]

Mohnhaupt

[11] Patent Number: 4,594,211

[45] Date of Patent: Jun. 10, 1986

[54] PREPARING POLYOLEFINE BASED OPAQUE FILM

[76] Inventor: Dietrich Mohnhaupt, La Fontaine, CH-1261 Bassins, Switzerland

[21] Appl. No.: 668,035

[22] Filed: Nov. 5, 1984

[51] Int. Cl.$^4$ .............................. B29B 9/06; B29B 9/16
[52] U.S. Cl. ..................................... 264/141; 264/23; 264/132; 264/145; 264/171; 264/210.6; 264/211; 264/283; 264/284; 264/349; 523/171; 524/232; 524/441; 524/491; 524/497; 524/500
[58] Field of Search ............... 264/141, 145, 349, 171, 264/108, 284, 283, 132, 210.6, 211, 23; 524/232, 441, 491, 497, 500; 523/171

[56] References Cited

U.S. PATENT DOCUMENTS

| | | | |
|---|---|---|---|
| 3,146,493 | 9/1964 | Steinle et al. | 264/141 |
| 3,455,871 | 7/1969 | Coover, Jr. et al. | 264/211 |
| 3,484,835 | 12/1969 | Trounstine et al. | 264/284 |
| 3,784,661 | 1/1974 | Schaul et al. | 264/211 |
| 3,919,164 | 11/1975 | Hattori et al. | 264/141 |
| 4,057,607 | 11/1977 | Soehngen et al. | 264/141 |
| 4,101,613 | 7/1978 | Norwood | 264/211 |
| 4,292,266 | 9/1981 | Weder et al. | 264/141 |
| 4,302,410 | 11/1981 | Beach | 264/142 |
| 4,490,323 | 12/1984 | Thomson | 264/211 |

*Primary Examiner*—Jeffery Thurlow
*Attorney, Agent, or Firm*—Ostrolenk, Faber, Gerb & Soffen

[57] ABSTRACT

A thin polyolefine based film, having a thickness of from about 15 to about 200 microns, which is perfectly non-transparent in spite of its low thickness. The film is composed of polyolefine as a homopolymer, an ethylene-vinyl acetate copolymer, and a pigment filler such as titanium dioxide as rutile, and aluminium powder. Color pigments and dispersing agents may also be present. The film is made by extrusion. It is used for tableclothes, book covers, protective sheets, wallpaper decoration, and, in pleated state, for flowerpot covers.

8 Claims, No Drawings

PREPARING POLYOLEFINE BASED OPAQUE FILM

This invention broadly relates to the field of thin opaque plastics materials and two-dimensional articles made thereof such as table-clothes, protective sheets for paper and cardboard articles such as books, exercise-books, diaries, file covers; as wrapping materials, curtain clothes, decorative sheets, flower-pot covers etc.

The invention especially contemplates polyolefine based opaque films having a thickness comprised between about 15 and 200 micrometers, a method for their preparation, and special articles made from said film.

It is well known to those skilled in the art that it has until now been considered as impossible to provide plastics sheets or films, made of polyolefines such as polyethylene or polypropylene, which are perfectly opaque, i.e. which are non-transparent and non-translucent, without seriously impairing their mechanical properties such as elasticity, tear resistance, flexibility and break elongation, and their melt index and touch; although the unblended raw polyolefines are normally slightly cloudy, perfect opacity can only be achieved by adding substantial amounts of pigments. For example, if titanium dioxide is used as a pigment, not less than 40 to 70% by weight thereof are necessary to achieve opacity. It has been found that such amounts lead to a substantial decrease of the desired physical and mechanical properties of the pigmented film. Furthermore, polyolefines are not compatible with plasticisers so that the flexibility of films cannot be controlled by the addition of such substances.

Plastics which are easier to render opaque by adding of pigments and which are compatible with plasticisers, are vinyl chloride polymers and copolymers. However, these materials should no longer be used due to environmental risks and the impossiblity of their flame-free disposal since they are not biodegradable.

Therefore, it is a first and major object of this invention to provide a thin, perfectly opaque, flexible film sheet or film web based upon the use of polyolefines which is further nearly untearable and which may easily be coloured in the mass.

Another object of the invention is to provide such film sheets or film webs containing substantial amounts of inexpensive pigments without impairing the advantageous mechanical and physical properties of the basic polyolefine.

Still another objectof the invention is to provide a new and useful method for preparing the above depicted polyolefine based film sheets or webs.

Finally, another object contemplated by the invention are useful bi-dimensional articles and objects made from the above mentioned film sheet or web such as table-clothes, curtains, protective sheets and covers, flower-pot covers and other ornamental devices. Further objects and features will become more readily apparent as the present description proceeds Now in order to implement these and still further objects of the invention, it has been found that a polyolefine intended to be used as a basic material for making an opaque film of the kind described above, is blended with at least one pigment filler and an ethylene-vinyl acetate copolymer. A further invention is seen in the way how the different additional products—to be described in detail later—are incorporated or blended into the basic polyolefine.

The expression "polyolefine" as used herein defines an olefine polymer free from non-olefinic comonomers and capable of forming self-supporting film sheets or webs. Examples of such polyolefines are polyethylene, polypropylene and ethylene propylene copolymers. Polypropylene is particularly preferred. Such polymers may contain, should a better flexibility be desired, small amounts of copolymerized butylenes. Normally, pure polybutylene does not form self-supporting films.

The expression "ethylene-vinyl acetate copolymer" as used herein means products obtained by copolymerisation of ethylene and vinyl acetate. The ethylene monomer may contain small amounts of propylene. The monomer ratios of ethylene to vinyl acetate on a weight basis may vary between 5:95 and 95:5. These copolymers as well as the above defined polyolefines are known products and sold by a great number of chemical companies, for example, Rhône-Poulenc in France, Hoechst and B.A.S.F. in Germany, I.C.I. in the U.K., Union Carbide, General Aniline and DuPont de Nemours in the U.S., Montecatini in Italy and others.

It is known that polyolefines are thermoplastic polymers made by polymerizing olefinic unsaturated hydrocarbons which, in turn, are obtained by the pyrolysis of aliphatic hydrocarbons as found in petroleum. Polyolefines are smooth, transparent or translucent, colourless and flexible; they do not contain plasticisers. This invention allows to obtain perfectly non-transparent products therefrom, in substantially maintaining the basic features like flexibility, touch and strength.

It has been found that the introduction of ethylene-vinyl acetate copolymer powders into polyolefines leads to opaque blends whose opacity is further improved by the addition of pigment fillers. Such fillers are known per se, and the expression "pigments" as used herein means finely divided particulate materials normally insoluble in the polymer phase. Typical fillers are inorganic powders such as zinc oxide, titanium dioxide, carbon black etc.; metals such as aluminium powder; and, of course, coloured pigments like iron oxides, phthalocyanines, chromium compounds, mono and bis azo pigments, dioxanine and anthaquinone pigments, all having a maximum particle size of about 1 micron, etc.; these pigments are known and commercialized products, see the corresponding distributor handbooks and leaflets. As filler pigments, colourless substances are preferred. Specially preferred is rutile titanium dioxide having a particle size of from 0.18 to 0.23 microns, and specially conditioned aluminium, see below.

To resume, the basic polyolefine is rendered opaque by the addition of powdered ethylene—vinyl acetate copolymer. The opacity obtained is improved by the addition of specially conditioned aluminium powder, and then carried to its maximum by the incorporation of the above described rutile titanium dioxide. Thus, the whole opacity is obtained in the mass and will be maintained after its extrusion to the film. No surface treatment to improve opacity is necessary as it has been frequently the case before this invention.

The film extruded from the mixture is typically brilliant. In order to obtain a mat surface, a special masterbatch is to be prepared according to the invention, which will afterwards be blended with polyolefine and extruded to give a mat, opaque film of the invention.

The general preparation of such masterbatches will now be described in detail with the aid of an example not construed to limit the invention.

First, aluminium powder is specially treated to enhance its compatibility with the other components of the masterbatch. Aluminium powder in its layer forming form, fitting in with ISO standard DR-1247, having an average particle size of 2 microns and being ultrasonically sieved, is pasted with paraffine oil in the weight ratio of 60 parts of aluminium to 40 parts of paraffine oil, with the addition of a known phenolic antioxydant agent (0.1 to 0.2 % by weight of the total paste), in an appropriate mixing device. Under the influence of the interfacial tension between the metal pigment and the oil, the aluminium particles get a lamellar structure capable of exercising a veil-like effect in the finished film web. The ethylene-vinyl acetate copolymer to be used should have a dry extract (i.e. total solids content) of at least 90%, typically of 99%, and an acid index of less than 15 mg, typically of 2 mg KOH/g. The powder is normally obtained by spray drying of an internally plasticized copolymer dis- persion.

The titanium dioxide pigment is the rutile form and should be made by the chlorine process (i.e. by hydrolysis of $TiCL_4$). It should have a low crystal size content and a particle size of less than 1 micron, preferably less than 0.5 micron, most preferably between 0.18 and 0.23 micron. The particles should be covered by an organic silicone preparation and resist to temperatures up to 300° C.

Furthermore, it is preferred to add auxiliary agents to the masterbatch such as lubrificants, typically metal stearates, anti-oxydants, blending agents, extrusion aids, of course coloured pigments, etc.

Should a mat film be prepared instead of a brilliant one, a matting filler is to be added, preferably amorphous porous synthetic silica untreated on the surface and milled to 2 microns or less. Other amorphous fillers having a particle size of 2 microns or less may also be used.

Then, the masterbatch can be prepared. To a cold turbo mixer, the following ingredients are added; the parts are by weight, and the "grades" refer to the melt index:

| | |
|---|---|
| 35 grade granulated polypropylene (homopolymer) | 4,500 parts |
| 35 grade powdered polypropylene (homopolymer) | 5,500 parts |
| Powdered ethylene-vinyl acetate copolymer (as above) | 500 parts |
| Aluminium-paraffine oil paste (60:40) | 167 parts |
| $TiO_2$ powder, rutile, 0.18 to 0.23 microns | 10,000 parts |
| Zinc stearate | 100 parts |
| Coloured pigments, q.s.; for example | 100 parts |

The masterbatch compostion may be combined within the following limits:

| | Parts by weight | |
|---|---|---|
| Component | general range | preferred range |
| polyolefine (homopolymer) | 100 | 100 |
| ethylene-vinyl acetate copolymer | 1–20 | 4–6 |
| aluminium oil paste | 0–10 | 1–2 |
| $TiO_2$ pigment | 30–65 | 40–60 |
| lubricant (metal stearate) | 0–2 | 0.5–1.5 |
| colour pigment | 0–20 | 0.5–10 |
| antioxydant | 0–1 | 0.1–0.2 |

The materials in the turbo mixer are then blended during 10 to 20 minutes. The so obtained blend is then further treated to obtain the final master batch. To do this, it is fed into a granulator installation comprising a double-screw-type extruder with injection moulding die for string extrusion, a cooling device, and a cutting device for cutting the extruded string into cylindrical granules.

The masterbatch is now granulated by feeding the blend into the running granulating installation. The granules obtained are the finished masterbatch.

In order to prepare the final film sheets of the invention, the granules of the masterbatch are mixed with more olefine homopolymer whose fluidity (melt index grade) is selected in function of the intended use. For example, into the feeding tunnel of a slot or blow extruder, the following components are fed, in parts by weight:

| | |
|---|---|
| Polypropylene (homopolymer) granules | 10,000 parts |
| Fatty amide (as extruding aid) | 10 parts |
| Masterbatch granules, composition as above | 2,800 parts |

A simple calculation shows that in the final mixture, 12,810 parts, 0.52% by weight of ethylene-vinyl acetate copolymer, 0.1% of aluminium and 10.48% of $TiO_2$ (rutile configuration) are contained.

The mixture is now heat extruded in a manner known to the man skilled in the art. An opaque and mass coloured film is obtained, brilliant or mat (depending upon the absence or presence of silica as a filler), having a thickness which may be selected by designing the extruder, between about 15 and 200 microns.

Evaluation of the product has given the following results:

| | |
|---|---|
| Thickness: | 30 microns (0.03 mm) |
| Opacity, expressed as contrast ratio, measured in colorimeter: | 76% |
| Stress at elasticity limit: | 304 kg/cm$^2$ |
| Shear module (1%): | 13007 kg/cm$^2$ |
| Izod shock resistance: | 0.66 |
| Deformation temperature: under stress (4.64 kg/cm$^2$) | 98.50° C. |

These values perfectly evidence the invention: whereas according to the prior art, an opacity of 76% can only be achieved by adding of at least 30% of $TiO_2$ pigment to polypropylene, with seriously impairing the mechanical properties of the mixture, as few as 10% are sufficient according to the invention.

The so obtained thin films may now be transformed into a great variety of final products; some of them should now be described.

Table-clothes

To cover tables where people are to eat, normally expensive clothes are used. To avoid this, it is known to cover the table with paper table-clothes. However, the paper has numerous drawbacks such as lacking wet strength, impossibility to clean or even to eliminate stains and spots, lack of tear resistance, etc. This invention provides competitive table-clothes free from all the drawbacks cited above and further having a paper-like touch, sound and feeling. These table-clothes are less elastic and deformable than other plastics table-clothes and are much less expensive. The transformation method is as follows:

First, the basic film is made according to the above-described method, for example using a polyolefine (e.g., polypropylene) having a melt index of from 4 to 9, and the film is brilliant and has a thickness of from 15 to 100 microns, coloured as desired. The flat film emerging from the extruder is then heat stabilized and mechanically surface treated, for example embossed, granulated or damasked, and this may be done by different ways. Such a surface treating installation may comprise two cooperating cylinders forming a nip through which the film is guided. The first cylinder is of steel and has the positive embossing design on its surface. The other cylinder is of resilient material such as compressed paper. On applying a preselected pressure to the cylinders, one against the other, and making them rotate when cold and in the absence of the film, the positive embossing will form a permanent corresponding negative embossing in the hard paper cylinder. Then, the steel cylinder is heated to about 100°-130° C., and the film is fed into the nip. It is reheated by the steel cylinder, becomes slightly plastic, and takes over the embossing or damasking, due to the heat and the pressure. When leaving the cylinder nip, the film rapidly cools down and maintains the embossed design.

During this treatment, the film is stabilized by the heating, and it leaves the cylinder in a less elastic and deformable state.

The cooling of the film may be effected by air ventilation. The low thickness of the film ascertains a neerly immediate cooling; static charges, if any, may be eliminated by known means. The feeding of the film to the two cylinders and its upwinding after having passed the nip should be done without substantial traction forces. It is preferred to unwind the film from a roll and to wind it up, respectively, in providing a pair of horizontally spaced driven cylinders whereupon the roll to be unrolled or to be formed, is resting.

Another system may comprise a preheating of the film before touching the embossing nip, by infrared or inductive or microwave heating. In this case, a steel embossing cylinder cooperating with a rubber lined cylinder can be used. Both cylinders are then water cooled.

Protecting covers

To protect books, notebooks and exercise books, to make intermediate sheets and other papershop articles, PVC films are often used whose price is relatively high. The film of the invention is still better suited. It is prepared according to the method described above, using a 3 grade polyolefine and making the thickness to about 50 to 200 microns. This film will be opaque, mass coloured, semi-mat and flexible. It is then damasked and embossed as described above. Its elasticity and deformability are strongly reduced by its heating during embossing; however, the film remains sufficiently flexible. Opaque sheets are obtained which are mass coloured, flexible and weldable by automatic cyclic heat impulsion technics, easy to cut.

Pleated films

The film of the invention may be pleated in a rather original way in order to render it decorative.

First, a film is made using the above-defined process, starting from polyolefine (polypropylene homopolymer) grade 9 to 4, the film having a thickness of 15 to 50 microns, being opaque, brilliant and flexible and coloured in the mass if desired. Now, it is fantasy pleated in the following manner. The flat film coming from the extruder is fed into a pleating apparatus heated to a temperature in the range of from 100° to 130° C., said pleating apparatus being such as currently used in textile pleating. The pleating confers an originality to the film in valorizing its special features such as luminosity and reflexes. The pleating brings about additional reflexes on surfaces and embossing or damasking facets of the film. The pleating as described which has never been applied, until now, to plastics films, favourizes the ornamental application thereof. The pleated film has lost elasticity to some extent, due to the heating treatment, but has now a high degree of elastic extension which is like a rubber one.

The pleated product may be used to cover unpleasant surfaces such as flower or plant pots. Flowerpot holders are commonly used which are often of embossed cardboard or of pleated decoration paper to adapt to the respective truncated cone form of the pots. The film of the invention, pleated and optionally impressed, advantageously substitutes for these paper bandages which are not resistant enough.

The pleated film of the invention may also be used as a wall cover. It may be stuck upon any wallpaper in order to facilitate its glueing on the wall and to stabilize it. The beauty brought about by the pleating will favorize the application of the film as a wall decoration. For this use, the film of the invention will normally be made as a mat one.

The films of this invention may be used for still other purposes. They are easily to weld by heat impulsion.

While there has been described presently preferred embodiments of the invention, it is to be distinctly understood that the invention is by no means limited thereto but may otherwise be variously embodied and practiced within the scope of the appended claims. For example, the masterbatch may be made in other mixers than turbo mixers. The mentioned extruders may be replaced by other film forming devices such as flat die injection molds, etc.

What is claimed is:

1. A method for preparing a polyolefine based opaque film sheet or film web, having a thickness in the range of from about 15 to about 200 micrometers, comprising an intimate blend of a olefine homopolymer, at least one pigment filler, and an ethylene-vinyl acetate copolymer, characterized by the fact that first a masterbatch is prepared in throughly blending polyolefine, copolymer and pigment, then granulating it by extruding the blend and cutting the extruded string into granules, mixing the granules with further polyolefine, and film extruding the mixture of polyolefine and masterbatch, wherein the amount of filler and copolymer is effective to produce an opaque sheet or film web without impairing the physical and mechanical properties of the pigmented film when compared to the nonpigmented film.

2. The method of claim 1, wherein the polyolefin is grade 35 polypropylene, the pigment is titanium dioxide in rutile form and powdered lamellar aluminum pasted with paraffine oil, and that colour pigments and zinc stearate as a lubricating agent are added to the masterbatch.

3. The method of claim 1, wherein the polyolefin used comprises a polyethylene having a melt index of from 35 to 2.

4. The method of claim 1, further comprising the addition of a color pigment, an extrusion aid and an antioxidizing agent to the masterbatch or its components.

5. The method of claim 1, wherein first a masterbatch is prepared from about 100 parts of a polyolefine homopolymer, about 1 to 20 parts of a ethylene-vinyl acetate copolymer, 0 to about 10 parts of aluminum paste containing 60% of laminar aluminum and 40% of a paraffin oil, 0 to about 2 parts of a lubricant, 0 to 20 parts of a colr pigment, and 0 to about 1 part of an antioxidant, all parts being by weight.

6. The method of claim 1, wherein the polyolefine used comprises a grade 9 to grade 2 polypropylene or polyethylene homopolymer, a brilliant film is made by extrusion to a thickness of about 30 to about 100 microns, and said film is embossed or damasked and cut into table cloths.

7. The method of claim 1, wherein the polyolefine used comprises a grade 3 polypropylene homopolymer, the film is extruded to a semi-mat sheet having a thickness of about 50 to about 200 microns, and is made up to portective book covers.

8. The method of claim 5, wherein said masterbatch is blended with more polyolefine homopolymer in a weight ratio of about 10,000 parts of polyolefine to about 2,800 parts of said masterbatch, the blend is extruded to a film of from 15 to 20 microns in thickness, the film is heat pleated at a temperature in the range of from 100 to 130° C., cut and finally welded into fowerpot covers or wallpaper decorations.

* * * * *